United States Patent [19]
Friend et al.

[11] Patent Number: 4,887,631
[45] Date of Patent: Dec. 19, 1989

[54] FIRE ISOLATION DEVICE

[75] Inventors: Alden E. Friend, Valencia; Lawrence A. Dunham, Northridge, both of Calif.

[73] Assignee: ITT Corporation, New York, N.Y.

[21] Appl. No.: 302,506

[22] Filed: Jan. 26, 1989

[51] Int. Cl.$^4$ ............................................... F16K 17/38
[52] U.S. Cl. ........................................ 137/74; 137/75; 137/79; 251/368
[58] Field of Search ..................... 137/72, 74, 75, 79; 251/368

[56] References Cited

U.S. PATENT DOCUMENTS

| | | | |
|---|---|---|---|
| 1,022,119 | 4/1912 | Barton | 137/75 |
| 2,586,248 | 2/1952 | Newman et al. | 137/74 |
| 2,707,965 | 5/1955 | Allen | 137/75 |
| 4,488,566 | 12/1984 | Hicks | 137/74 |
| 4,741,509 | 3/1988 | Bunch et al. | 251/174 X |
| 4,792,115 | 12/1988 | Jindra et al. | 137/74 X |

FOREIGN PATENT DOCUMENTS

| | | | |
|---|---|---|---|
| 2304013 | 10/1976 | France | 137/74 |
| 1594982 | 8/1981 | United Kingdom | 137/74 |

Primary Examiner—John Rivell
Attorney, Agent, or Firm—Menotti J. Lombardi

[57] ABSTRACT

A fire isolation device having a valve designed to close after a given temperature has been reached by a fusible nose member in the form of a sleeve of fusible material. The device has a passageway therethrough and a self-closing valve member having a poppet and a seat disposed in the passageway with the poppet being biased toward the seat to a valve closed position. At least one aperture through the nose member provides for continuous fluid flow through the device around the poppet and the seat. The nose member is positioned to hold the valve in an open position against the bias on the poppet. The seat has a flow path on its outer end dimensioned to fit the nose member and a flow path towards its inner end larger in diameter than the nose member in an area occupied by the aperture to permit flow therethrough when the nose member holds the valve in an open position. The nose member is made of a material designed to melt in the neighborhood of 700° F. when the fire isolation device is exposed to 2000° F. for 15 minutes, for example, after which it will collapse into the larger diameter permitting the bias to close the valve. The nosse member is designed to melt prior to an attached component in order to prevent fluid leakage at the component. The remainder of the parts of the device are made of a higher temperature resistant material.

In a second embodiment a bi-directional device is provided in which valve and nose members are positioned in both ends thereof.

20 Claims, 1 Drawing Sheet

FIRE ISOLATION DEVICE

BACKGROUND OF THE INVENTION

1. Field of the Invention

This invention relates to a fire isolation device which is biased to close upon reaching a given temperature and more particularly to such a device including a fusible member holding a self-closing valve open prior to reaching the given temperature.

2. Description of the Prior Art

U.S. Pat. No. 3,245,423 Hansen, et al.; U.S. Pat. No. 195,367 Hiller; U.S. Pat. No. 1,930,624 Ryan and U.S. Pat. No. 2,048,387 Johnsen all relate to valve couplings with fusible safety cutoff means. These devices are generally for lower temperature applications than that of the subject invention and all employ the use of a fusible material around the outside diameter of a member such that when the material melts the member moves permitting a biased poppet to close a valve. They are used for applications such as boiler protection.

Another group of patents, U.S. Pat. No. 2,305,841 Carlson, U.S. Pat. No. 2,434,167 Knoblauch and U.S. Pat. No. 2,850,297 Clark disclose quick disconnect couplers which are designed to prevent loss of fluid flow when the coupling is disconnected. These devices employ no fusible materials.

U.S. Pat. No. 3,659,624 Kelly, et al., U.S. Pat. No. 3,842,853 Kelly, et al. and U.S. Pat. No. 3,896,835 Wicke all disclose gate valves. Kelly, et al. 624 employs a locking ring 50 of fusible material which when upon melting allows expansion of the locking fingers 52 permitting the gate valve to close. Kelly, et al. 853 employs a fusible disk 173 which upon melting is extruded through the port 171 permitting the piston member to close the gate valve. Wicke employs a similar structure. None of these last three references employ a fusible nose member in the flow path through the gate valve.

U.S. Pat. No. 3,618,627 Wagner discloses a temperature responsive pressure relief employing a fusible material behind a spring biased poppet which opens upon over temperature.

U.S. Pat. No. 4,225,760 Griffith, et al. discloses a pressure responsive valve which closes when plug 54 melts by means of fluid pressure such that there is some loss of fluid prior to closure.

In accordance with an aspect of the present invention, it is an object to provide a new and improved fire isolation device capable of operating at high temperatures such as 2000° F for up to 15 minutes which employs a fusible member through which the fluid normally flows which biases a valve poppet open.

Another object is to provide such a device which is bidirectional, having a valve member held open by a fusible nose member in both ends thereof.

SUMMARY OF THE INVENTION

The foregoing and other objects are accomplished by providing a fire isolation device having a passageway therethrough with a self-closing valve having a poppet and seat disposed in the passageway, the poppet being biased toward the seat. A nose member in the form of a sleeve of fusible material having at least one aperture therethru to provide a continuous fluid flow path thru the device is positioned to hold the poppet open. The flow path in the outer end of the seat is dimensioned to fit the nose member and the flow path towards its inner end is larger in diameter than the nose member in the area occupied by the aperture through the nose member to permit flow therethrough when the nose member holds the valve in an open position. The nose member is made of a material designed to melt in the neighborhood of 700° F. when the device is exposed to 2000° F. for 15 minutes, for example, after which it will collapse into the larger diameter permitting the bias to close the valve prior to any attached component melting, at for example, 1200° F., preventing fluid loss thru the component. The remainder of the parts of the device are made of a higher temperature resistant material.

In a second embodiment valve members and nose members are positioned in both ends of a device in the manner described above.

Other objects, features and advantages of the invention will become apparent from a reading of the specification when taken in conjunction with the drawings in which like reference numerals refer to like elements in the various views.

DESCRIPTION OF THE PREFERRED EMBODIMENT

The device of the subject invention is designed to prevent the fueling of fire by fluids of a system pressure line. When exposed to a high temperature flame such as 2000° F. for 15 minutes the device will isolate line fluid from the fire prior to leakage and melting of any component to which it is connected and may be designed to be interchangeable for instance with an AN815 fitting.

Figure 1:
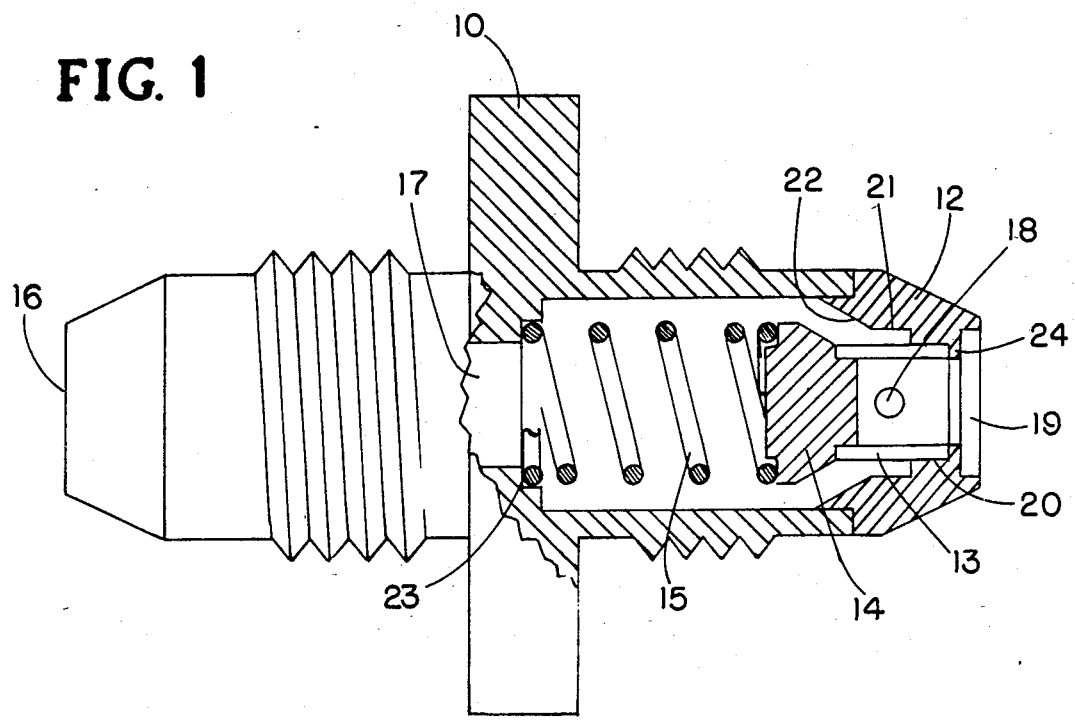
FIG. 1 is a partially cut-away side view of an embodiment of the device of the subject invention designed for unitary flow.

Referring to FIG. 1 the fire isolation device consists of a housing 10, an end seat 12, a nose member of fusible material 13, a valve poppet 14 and a compression spring 15. Housing 10, end seat 12, and poppet 14 may be made of 316L stainless steel. Fusible nose member 13 may be made from thermoplastic, for example, polyetheretherketone thermoplastic (peek). Under normal operation the fluid flows in the entrance 16 to the device through the center aperture 17 around the spring 15 past the poppet 14 and through the nose member 13 through an aperture 18 therein and out the port 19. Spring 15 seats against a shoulder 23 in housing 10. The nose member 13 is positioned snugly in the inside diameter 20 on the outer end of seat 12 and up against a flange 24 on end seat 12 which is integral therewith and has the same inside diameter as nose member 13. Seat 12 has a larger diameter 21 at its inner end through which the fluid normally flows to get to the aperture 18 and out port 19.

The device is designed to operate on exposure to elevated temperature of about 2000° F. for about 15 minutes, for example. The fusible nose member 20 will melt upon reaching 700° F. and allow the spring loaded poppet 14 to close preventing fluid leakage thru any attached component, not shown, which may melt at 1200° F., for example. The fusible nose member 13 will collapse into the larger diameter 21 and the poppet will seat against the beveled portion 22 of seat 12.

Thus, any component such as an aluminum instrument which might be attached to output port 19 will melt at approximately 1218° F. but the poppet 14 will close off the fuel source, not shown, attached to input port 16 preventing fuel from entering the area of the fire.

Figure 2:
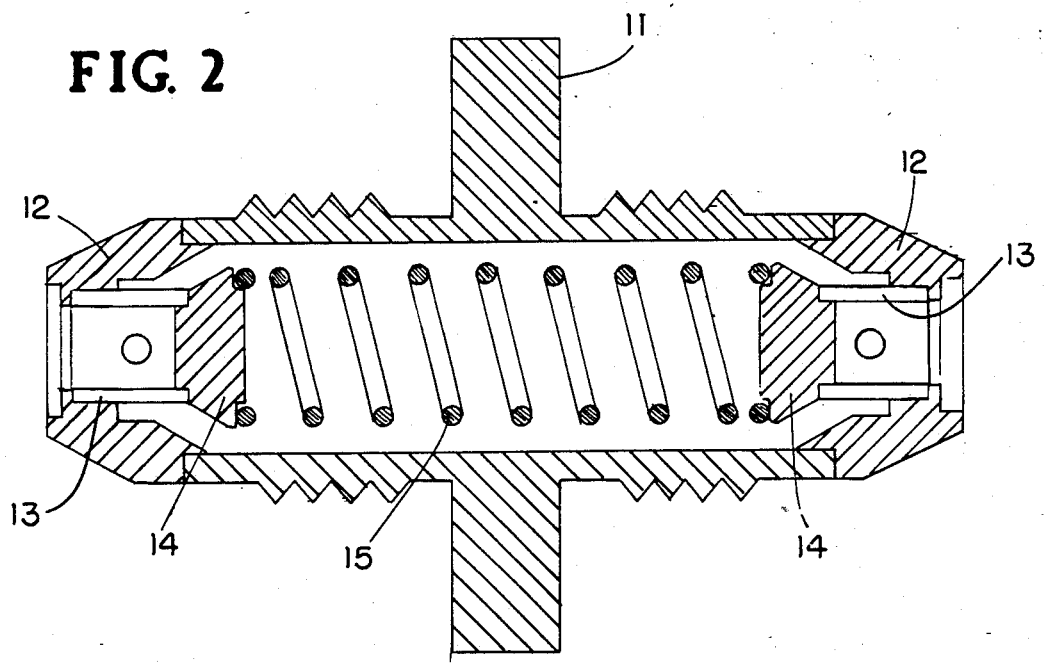
FIG. 2 is a cut-away side view of the device of the subject invention employing valve members in both ends thereof.

FIG. 2 discloses a bi-directional device in which the fitting 11 which has a single inside diameter and no shoulder 23 such as used in FIG. 1, employs nose members 12 on both ends thereof, each having its corresponding poppet 14 and fusible nose member 13. A common spring biases both poppet members 14 toward their respective seats.

The device of the subject invention is mechanically biased and operated as opposed to the prior art Griffith patent which is pressure operated and permits some leakage. The subject device prevents leakage by closing mechanically prior to failure of an attached component preventing loss of system fluid whereas the Griffith prior art device allows loss of system fluid until sufficient fluid flow under pressure occurs to create enough pressure drop across the poppet to cause closure.

The subject invention is a stand alone design requiring no outside mechanical influence for proper operation and functions in all positions with no effect on performance. The subject invention is designed to be used in any component or in line system applicaton and is designed with single and dual poppet versions. The dual poppet version cannot be installed backwards and operates the same in either flow direction. The subject invention is not affected by vibration and shock.

Because of weight and cost many aircraft components are made of materials that cannot meet the fireproof (2000° F. flame for 15 minutes) or even fire resistant (2000° F. flame for 5 minutes) requirements. It is necessary to protect such components so that when a fire takes place there will not be fluid loss through the components, thus the application for the subject invention in fire protection of hydraulic systems, fluid systems, lube oil systems and components for aircraft engines and other airborne applications. Other applications may include military, equipment, tanks, trucks, buses, submarines, aircraft carriers and all types of ships as well as radar systems for the military commercial and industrial applications. Other possible uses include chemical plants and processing systems, refineries and other fuel and oil processing plants.

While particular embodiments of the invention have been described, it will be understood of course that it is not intended to limit the invention thereto since many modifications may be made. It is therefore contemplated by the appended claims to cover any such modifications as fall within the true spirit and scope of the invention.

What is claimed as new and desired to be secured by letters patent of the U.S. is:

1. A fire isolation device capable of operating at high temperatures such as 2000° F. for up to 15 minutes, the device having a passageway therethrough, a self closing valve having a stainless steel poppet and a stainless steel seat disposed in said passageway with said poppet mechanically biased toward said seat to a valve closed position closing the passageway through the device, a nose member in the form of a sleeve of fusible material having at least one aperture therethrough to provide a continuous fluid flow path through said device around said poppet and through said seat and being positioned to hold said valve in an open position against the bias on the poppet, said seat having a flow path on its outer end dimensioned to fit said nose member and a flow path towards its inner end larger in diameter than said nose member in the area occupied by said at least one aperture to permit flow therethrough when said nose member holds said valve in an open position, said nose member being of a material to melt prior to the melting of an attached component after which the nose member will collapse into said larger diameter permitting said bias to close the valve and the remainder of the parts of the device being made of higher temperature resistant material.

2. The device of claim 1 in which said nose member is made of polyetheretherketone thermoplastic.

3. A bidirectional fire isolation device capable of operating at high temperatures such as 2000° F. for up to 15 minutes, the device having a passageway therethrough, a self-closing valve having a stainless steel poppet and a stainless steel seat disposed in each end of the passageway with each poppet mechanically biased towards its seat to a valve closed position closing passageway through the device, a nose member in the form of a sleeve of fusible material in each end of said device having at least one aperture therethrough to provide a continuous flow path through said device around said poppet and through said seat and each being positioned to hold its respective valve in an open position against the bias on the poppet, each seat having a flow path on its outer end dimensioned to fit its nose member and a flow path towards its inner end larger than the diameter of its nose member in the area occupied by said at least one aperture to permit flow therethrough when its nose member holds the valve in an open position, the nose members being of a material to melt prior to the melting of an attached component after which the nose members will collapse each into their adjacent larger diameter of their valve seats permitting said bias to close the valves and the remainder of the parts of the device being made of higher temperature resistant material.

4. The device of claim 3 in which said nose members are made of polyetheretherketone thermoplastic.

5. The device of claim 3, wherein said valve is not affected by vibration and shock.

6. A fire isolation device for mounting in a fluid line to prevent fluid flow through the device when exposed to a high temperature such as 2000° F. for 15 minutes, said device comprising in combination:

a housing having a fluid passageway therethrough;

a poppet and a seat disposed in said passageway;

bias means for mechanically biasing said poppet toward said seat to a closed position for closing said passageway;

a fusible nose member having at least one aperture therethrough to permit fluid flow through said aperture, said nose member being positioned to hold said poppet in an open position against the bias on said poppet;

said seat having an outer end diameter dimensioned to fit said nose member and an inner end diameter larger than said outer end diameter, so that when said nose member holds said valve poppet in an open position, fluid flow is permitted through the nose member aperture toward its inner end diameter; and said nose member being of a material which melts at a temperature lower than the melting temperature of the material forming said poppet, seat, housing, and bias means, whereby when said nose member melts it collapses causing said poppet to seat on said seat closing said passageway to prevent fluid flow therethrough.

7. The combination according to claim 6 wherein said housing, poppet, and seat are made of stainless steel.

8. The combination according to claim 7 wherein said nose member is made of polyetheretherketone thermosplastic.

9. The combination according to claim 8 wherein said bias means is a compression spring positioned between a shoulder in the passageway of said housing and said poppet.

10. The combination according to claim 9 wherein said housing has exterior threads at each end for mounting directly in said fluid line.

11. A bidirectional fire isolation device for mounting in a fluid line to prevent fluid flow through the device when exposed to a high temperature such as 2000° F. for 15 minutes, said device comprising in combination:
   a housing having a fluid passageway therethrough;
   a poppet and associated seat disposed in each end of said passageway;
   bias means for mechanically biasing said poppet in each end toward its associated seat to a closed position for closing said passageway;
   a fusible nose member in each end of said passageway having at least one aperture therethrough to permit fluid flow through said aperture, each said nose member being positioned to hold said poppet in a respective end in an open position against the bias on said poppet;
   each said associated seat having an outer end diameter dimensioned to fit said nose member, and an inner end diameter larger than said outer end diameter, so that when each said nose member holds said poppet in the respective end in an open position, fluid flow is permitted through each nose member aperture and said passageway; and
   each said nose member being of a material which melts at a temperature lower than the melting temperature of the material forming said poppet, seat, housing, and bias means, whereby when either said nose member melts it collapses causing said poppet in the respective end to seat on its associated seat to prevent fluid flow through the device.

12. The combination according to claim 11 wherein said housing, poppet, and seat are made of stainless steel.

13. The combination according to claim 12 wherein said nose member is made of polyetheretherketone thermoplastic.

14. The combination according to claim 13 wherein said bias means is a compression spring positioned between each said poppet.

15. The combination according to claim 14 wherein said housing has exterior threads at each end for mounting directly in said fluid line.

16. Apparatus comprising in combination:
   a housing having a passageway therethrough;
   an end seat fitted to at least one end of said housing, said seat including an inside diameter portion, a larger diameter portion, and a beveled portion;
   a sleeve shaped fusible nose member having an aperture therethrough, one end of said nose member being fitted to said inside diameter and the other end being adapted to mount a poppet;
   a compression spring mounted in said passageway to bias said poppet toward said end seat, said poppet being prevented from closing on said seat by said nose member; and
   said nose member being of a material that melts at a temperature lower than the melting temperature of the material forming said housing, end seat, poppet, and compression spring, whereby when said nose member melts it collapses into the area of said larger diameter portion permitting said compression spring to close said poppet against said beveled portion of said end seat to prevent fluid flow through said passageway when said apparatus is exposed to an elevated temperature of about 2000° F. for about 15 minutes.

17. The combination according to claim 16 wherein said housing, poppet and seat are made from 316L stainless steel.

18. The combination according to claim 16 wherein said nose member is made of polyetheretherketone plastic.

19. The combination according to claim 16 wherein said housing has exterior threads at each end for mounting in apparatus in a fluid flow line.

20. The combination of claim 16, wherein said apparatus is not affected by vibration and shock.

* * * * *